United States Patent [19]

Young

[11] Patent Number: 4,665,402

[45] Date of Patent: May 12, 1987

[54] RADAR SIGNAL PROCESSING SYSTEM

[75] Inventor: Willard A. Young, Brampton, Canada

[73] Assignee: Litton Systems Canada, Ltd., Etobicoke, Canada

[21] Appl. No.: 492,206

[22] Filed: May 6, 1983

[30] Foreign Application Priority Data

May 18, 1982 [CA] Canada ................................ 403180

[51] Int. Cl.[4] .............................................. G01S 7/04
[52] U.S. Cl. ...................................... 342/91; 342/176; 358/169
[58] Field of Search ........... 343/17.2 PC, 5 CE, 5 CF, 343/7 ED, 5 DP, 5 CD, 5 PN, 5 SA, 5 SM, 5 VQ, 7 PG; 358/168, 169, 219, 160, 166; 455/234; 330/75, 129, 144; 328/53, 146, 175; 364/734, 811; 342/91, 92, 176

[56] References Cited

U.S. PATENT DOCUMENTS

| | | | |
|---|---|---|---|
| 3,495,076 | 2/1970 | Jespers et al. | 364/734 |
| 3,761,922 | 9/1973 | Evans | 343/5 DP |
| 3,979,555 | 9/1976 | Opittek et al. | 358/160 |
| 3,983,320 | 9/1976 | Ketcham et al. | 358/166 |
| 3,996,421 | 12/1976 | Pruznick et al. | 358/166 |
| 4,050,085 | 9/1977 | Prince et al. | 358/219 |
| 4,054,786 | 10/1977 | Vincent | 364/734 X |
| 4,218,662 | 8/1980 | Schröder | 330/144 |
| 4,249,177 | 2/1981 | Chen | 343/5 CF X |
| 4,296,320 | 10/1981 | Miller | 250/252.1 |
| 4,315,319 | 2/1982 | White | 364/571 |
| 4,394,744 | 7/1983 | Wrench, Jr. | 358/166 X |

Primary Examiner—Thomas H. Tarcza
Assistant Examiner—Bernarr Earl Gregory
Attorney, Agent, or Firm—Gerald L. Cline

[57] ABSTRACT

The application describes digital signal processing of radar video signals to provide an optimum display. Three interacting components of the system are further described in detail: a global mean estimating circuit, a statistical analyzer circuit, and a dynamic range compression circuit. The global mean estimating circuit determines the mean of the amplitude distribution of video signals over a wide section of the display as opposed to a local mean of signals. A local mean of signals is the mean of the amplitude distribution of video signals occurring in the near vicinity of a point on the display. The statistical analyzer circuit evaluates the amplitude distribution of video signal samples and controls the gain of the signal path so that the variance of the sampled amplitude distribution follows the variance of a model distribution. The dynamic range compression circuit functions to compress the range of amplitude distribution in a manner to provide maximum information from the display.

18 Claims, 8 Drawing Figures

RADAR SIGNAL PROCESSING SYSTEM

This invention relates to signal processing circuits, particularly adapted for the processing of radar video signals, which compress the dynamic amplitude or intensity range of the video signals in a fashion to make most effective use of the display. The display unit can be a CRT or some other type of display unit with limited intensity range. That is, such display units have a limited range of gray shades which can be distinguished by an operator, and to make maximum use of the received information it should be presented so that information of significance falls into regions of intensity most readily visible by the operator.

In its most general form the present invention relates to a signal processing system intended to adapt a received signal for use with a display having a limited dynamic range. The phase "dynamic range" is used to denote the ratio of maximum to minimum brightness discernable on the display. The system comprises apparatus for estimating the mean value of the signal over a selected portion of the area of the display, a variable gain amplifier in the path of the signal coupled to an analog-to-digital converter to provide a sequence to signal samples, a statistical analyzer responsive to the signal samples to measure the spread of the amplitude distribution of the samples, means controlling the gain of the amplifier to maintain the spread of the distribution matched to that of a model distribution and signal compression means responsive to the output of the amplifier to produce a signal of limited dynamic range for use with the display. The mean value of the signal is normally the arithmetic mean but other mean values may be used in different applications. The phrase "spread of the amplitude distribution" is used as a general term corresponding to the variance of a binomial distribution or a similar measure of deviation from the mean value.

Also specifically disclosed is a method and apparatus for estimating the mean of a sequence of digital signals comprising: generating pseudo-random sequence of pulses synchronized to the digital signal sequence to obtain a sequence of sampling signals from a characteristic of the pseudo-random sequence, selecting and storing such digital signals as occur in coincidence with the sampling signals, accumulating the values of the selected and stored digital signals up to a predetermined number thereof, thereafter increasing the accumulated amount by each next selected digital signal and decreasing the accumulated amount by the value of the digital signal occurring earlier by the predetermined number in the sequence selected, and dividing the number in the accumulator by the predetermined value to obtain a measure of the mean.

The present invention also contemplates a method and apparatus for maintaining the spread of the amplitude distribution of a signal matched to the spread of a model distribution comprising the steps of: passing the signal through a variable gain amplifier, sampling the output of the amplifier to provide a sequence of discrete sample values, counting those sample values which exceed a preset upper tail break-point value and using the measure thus determined to control the gain of the amplifier.

Yet another aspect of the invention contemplates a method and apparatus for transforming input signal samples of a certain amplitude distribution to a compressed amplitude distribution, including a system for establishing the break-points of the compressed distribution, comprising: storage means having addresses corresponding to each possible discrete input sample amplitude, means incrementing by one the number stored at an address on detection of an input sample of corresponding amplitude, a first counter counting the total number of signal samples and dividing the total by a factor representing the number of possible amplitudes in the compressed distribution to obtain the number of samples occurring at each amplitude level of the compressed distribution, a second counter responsive to the storage means to accumulate the stored numbers when read out in sequence including means to indicate when the accumulated count exceeds the last-mentioned number thereby establishing the address last read as the first break-point and further indicating when the accumulated count exceeds twice the last-mentioned number thereby establishing the second break-point and so on.

An alternative manner for performing this last described function is described, being a method and apparatus for compressing the amplitude distribution of a series of signal samples falling within a finite amplitude range, comprising: supplying the series of samples in parallel to a plurality of comparators having monotonically increasing level settings, detecting the comparator having a level setting immediately above the amplitude of the applied signal sample and generating an output signal indicative of that comparator, counting the output signals from each comparator, and adjusting the discriminating level settings so that the counts attributable to each comparator remain substantially equal.

Particular embodiments of the invention will now be described in conjunction with the accompanying drawings in which:

FIG. 1 is a block diagram showing the interrelationship of the inventive components of a specific embodiment of the invention, FIG. 2 is a diagrammatic representation of the amplitude distribution of a typical radar display signal, FIG. 3 is a block diagram similar to FIG. 1 but in greater detail, FIG. 4 is a block diagram of the mean estimating circuit 11 of FIG. 1, FIG. 5 is a block diagram of a circuit for maintaining a constant variance, FIG. 6 is a block diagram of an adaptive dynamic range compression circuit, FIG. 7 is a typical histogram of an exemplary amplitude distribution curve showing break-points, and FIG. 8 shows a further embodiment of an adaptive dynamic range compression circuit.

DETAILED DESCRIPTION OF THE PREFERRED EMBODIMENTS

Figure 1:
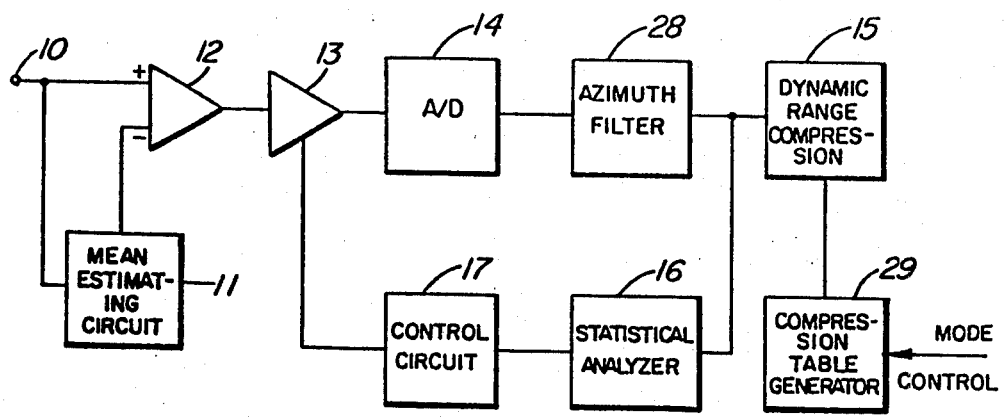

FIG. 1 shows a block diagram of typical components of a signal compression system which functions according to this invention to compress a wide dynamic range of radar video signal returns to a narrow dynamic range of intensity sufficient for the usual CRT display. Such signal returns, for example, may have of the order of 12 bits of information while only 4 bits are needed at the CRT display. The dynamic range is modified by the invention to provide the operator with the maximum amount of information within the capability of the CRT display. The radar video signal is supplied to terminal 10 as an analog signal. The amplitude distribution of the video signal is preferably modified by subtracting the mean amplitude level from it, in subtractor 12. The necessary mean amplitude level is computed in a mean estimating circuit 11. The modified radar video signal then has amplitude values distributed about a zero mean. The modified signal passes through a variable gain amplifier 13 and is converted to a sequence of digital values in an analog-to-digital converter 14 (herein called A/D converter). The digitized signals from converter 14 pass through an azimuth filter 28 to a dynamic range compression circuit 15. The digitized signal at the output of the azimuth filter is supplied to a statistical analyzer 16. The output from the statistical analyzer is supplied to a control circuit 17 to vary the gain of amplifier 13.

A typical dynamic amplitude range compression circuit 15 uses a memory programmed with a model video distribution curve that represents a desired compression relation. That is, the azimuth filter output is a string of data words each containing n bits and corresponding to one amplitude sample. $2^n$ possible amplitude addresses are available in the memory and each address converts to one of 16 possible output codes according to a model curve which has been programmed into the memory. Compression table generator 29 may contain the specification of several curves so that the appropriate curve may be selected depending on the type of environment being scanned by the radar system. That is, if the radar return is expected to contain a predominance of a certain range of amplitude values, then the memory can allot most of the dynamic range of the display to these values. The selection of a particular compression table can be based upon predetermined histograms generated from radar simulation programs or from predetermined criteria applied to the received radar signals. Alternatively, the model curves may be consecutively or continuously created in the memory depending upon recently received samples.

Figure 2:
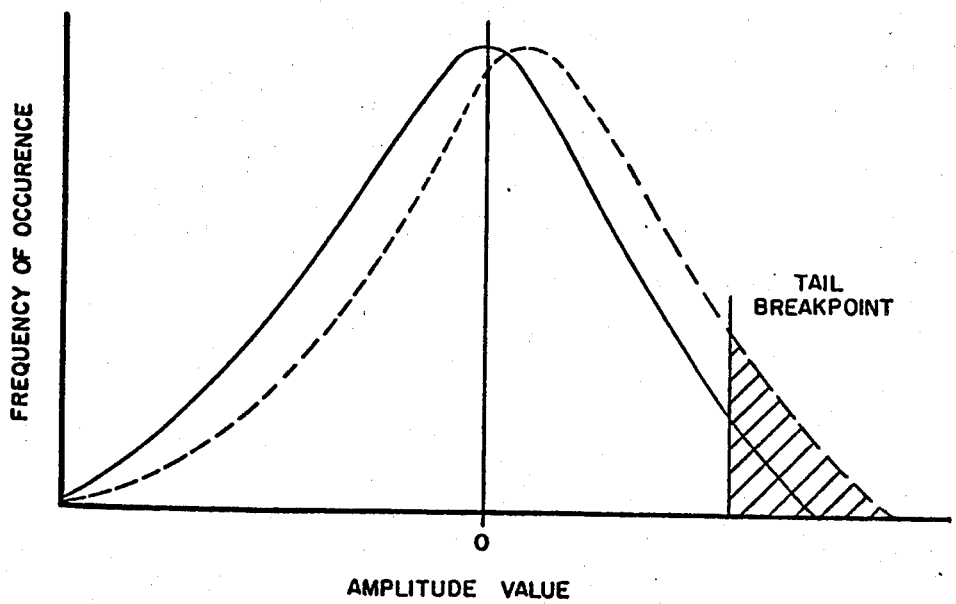

The function of circuits 11 and 16 is illustrated with reference to FIG. 2. The solid line represents a typical model compressed amplitude distribution curve (herein called a compression curve) which has been programmed into the memory. The received radar video signal distribution is shown by the broken line. For the range compression circuit of the invention to be effective the arithmetic mean of the distribution of the received amplitude signals should be substantially equal to the arithmetic mean of the compression curve. The mean estimating circuit 11 accomplishes this by repeatedly computing an estimate of the arithmetic mean of the received signals which is used as an offset signal subtracted from the incoming signal. Such amplitude offset varies from region to region within a single scan. Preferably the arithmetic mean is computed as a running estimate taken over a predetermined sample whose size is controlled.

Having centered the arithmetic mean of the incoming radar video signal distribution on the arithmetic mean of the compression curve, the width of the distribution of incoming signals may not match the width of the compression curve stored in the memory. To control the matching by varying the gain, a value called the tail break-point is established. As sampling is carried out, a count is kept of the number of samples having an ampitude in excess of the amplitude of the tail break point. After a predetermined number of samples have been examined if the number of samples whose amplitude exceeded the tail break-point is not as large as expected the gain of amplifier 13 is increased. If the number of samples having an amplitude in excess of the tail breakpoint is larger than expected the gain of amplifier 13 is reduced. This is accomplished by means of control circuit 17 whose digital output is supplied to variable gain amplifier 13. Depending on the digital signal from control circuit 17 the gain of amplifier 13 is either increased or decreased.

Figure 3:
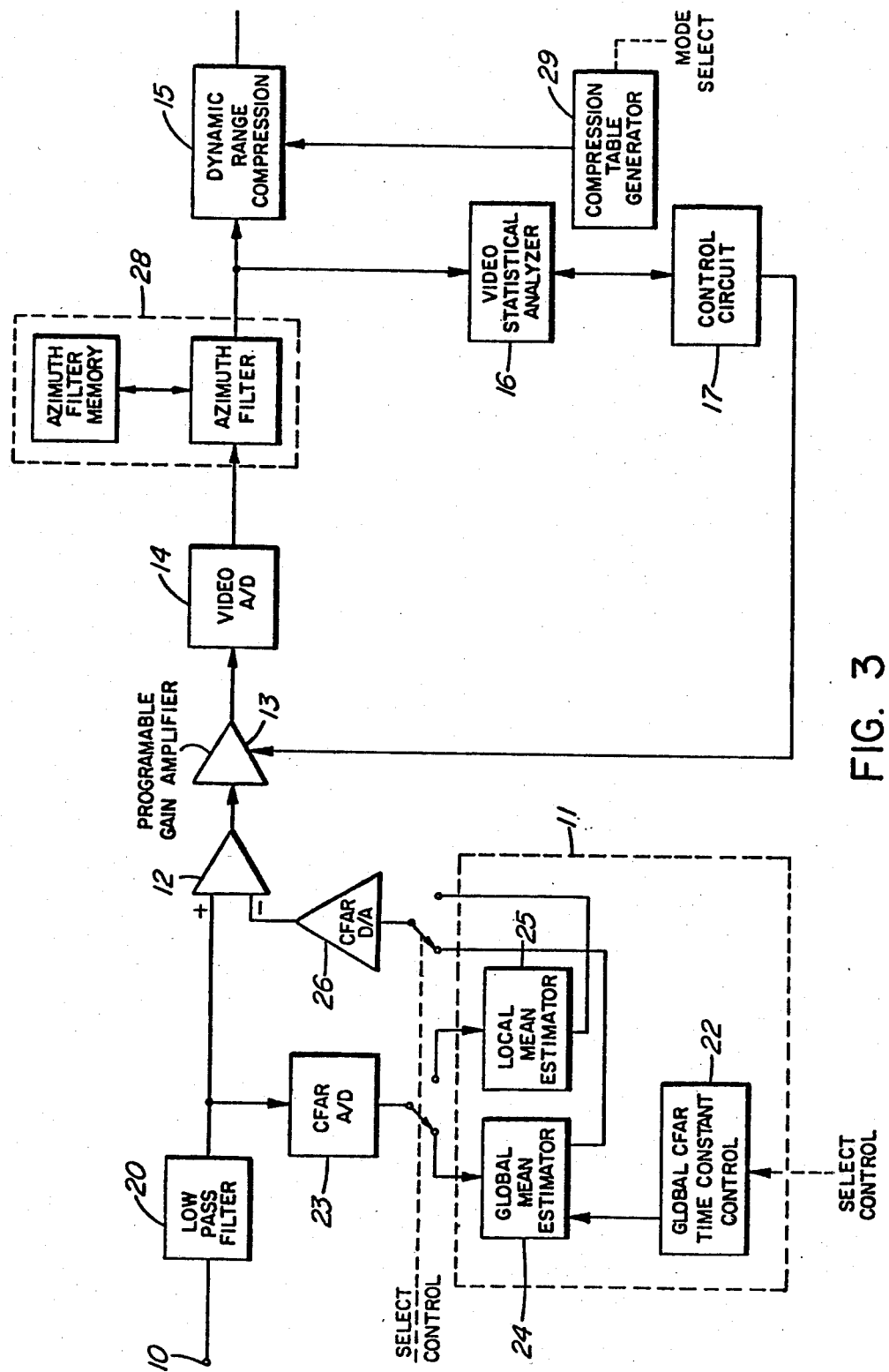

FIG. 3 shows the overall system is greater detail than FIG. 1. The incoming radar video systems at terminal 10 passes through a low pass filter 20 and summing network 12 to the variable gain amplifier 13. Digital sampling for the mean estimating circuit is performed by CFAR (Constant False Alarm Rate) A/D converter 23 the output of which is selectively connected to mean estimating circuits 24 or 25. The local mean estimator computes an estimate of the arithmetic mean of, for example, the amplitudes of 8 samples in the immediate vicinity of each radar position point. It computes a running average of the video signal amplitude and this running average is subtracted from the amplitude of the radar video signals to cause the signal at the output of summing circuit 12 to have a substantially zero arithmetic mean.

The local mean estimator 25 removes variations in the mean corresponding to variations in the radar-reflecting properties of the environment within a very small optical angle of the radar. It therefore removes much information of interest in land mapping by performing the approximate equivalent of differentiation. Edges are enhanced, but gradual variations are removed and it is therefore not always useful.

Once the local arithmetic mean signal has been determined, it is selectively connected through CFAR digital-to-analog (herein called D/A) converter 26 and the analog signal from converter 26 is subtracted in circuit 12 from the incoming radar video signal.

Variable gain amplifier 13 ensures that the amplitude distribution of the radar video signals is such that it may be compared to a model distribution curve in the following dynamic range compression circuit 15. A signal processing circuit such as azimuth filter circuit 28 having a related memory may be used in the system but does not form part of the present invention.

Major components of the signal processing system of this invention are the mean estimating circuit 11 (particularly the global mean estimator 24), the statistical analyzer 16 together with the control circuit 17 for controlling the gain of amplifier 13 and the dynamic range compression circuit 15. The global mean estimator 24 is believed to be unique both in itself and in combination with the rest of the system.

Figure 4:
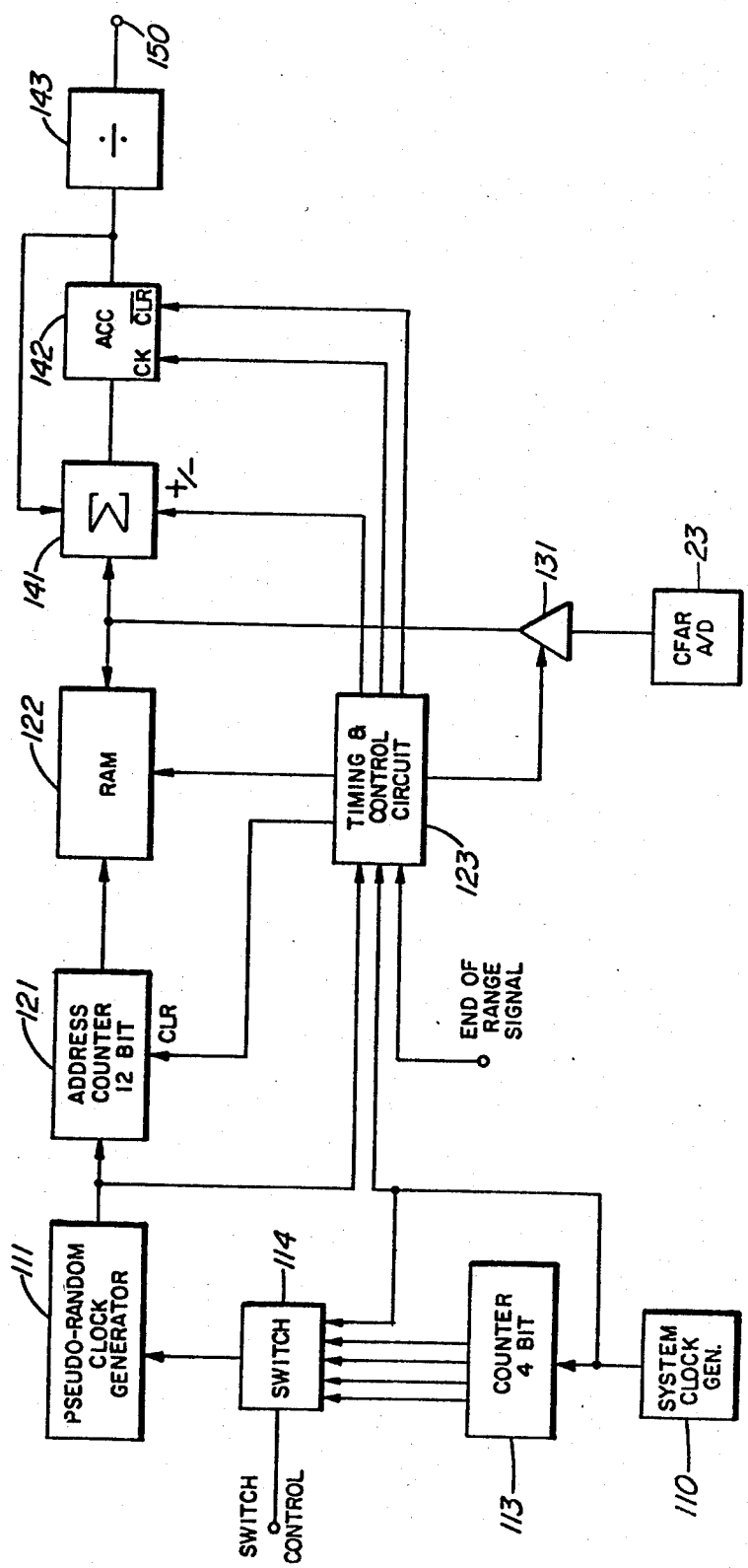

An estimate of the arithmetic mean of the video amplitude distribution for a complete radar scan is obtained by sampling the radar video signal and storing consecutive samples. The sum of the stored samples is then used to establish the mean. The samples taken from the video signal need not correspond to immediately adjacent radar coordinates. The samples are selected under control of a pseudo-random clock generator 111 (FIG. 4) to cover the area desired. Typically, samples from A/D converter 23 are averaged to generate a running estimate of the mean over 4096 samples. These samples are distributed over a sector whose size may be controlled by changing the frequency of the sampling clock 110, 113 (FIG. 4). The sector size also depends on the range selected, for there may be more samples per sweep on longer range settings of the radar system. Preferably, the number of samples in the estimate is fixed s that the density of samples varies inversely with the sector area.

GLOBAL MEAN ESTIMATING CIRCUIT

The global mean estimator 24 is shown in FIG. 4. Pseudo-random clock generator 111 receives a sampling signal at either the system clock frequency from clock generator 110, or a sub-multiple of this frequency from 4 bit counter 113, under control of switch 114. In an alternative embodiment, circuit 111 may be a random generator. When an output is produced by a pseudo-random generator 111 address counter 121 advances to select the next address in a random access memory 122. An output from pseudo-random generator 111 also triggers timing circuit 123 to gate a signal sample from A/D converter 23 into memory 122 and, through summing circuit 141, to accumulator 142. Prior to the addition of a new sample from gated buffer amplifier 131 into the summing circuit 141 and the simultaneous writing of the same sample into the memory 122 at the new address given by address counter 121, the previous sample in memory 122 at the same address (which corresponds to the sample written 4096 samples previously in the sequence) is read from memory 122 and subtracted from the accumulated sum in accumulator 142 by means of summing circuit 141. Thus, this previously recorded sample is removed from the accumulated total. Then the new sample from gated buffer amplifier 131 is delivered to memory 122 to be written into the new address and delivered to summing circuit 141 to be added to the accumulated total in accumulator 142. Thus, a running total of the 4096 most recent samples is in accumulator 142 and the eight most significant bits of this total are supplied to terminal 150 via dividing circuit 143 as a measure of the global mean. It will be clear that the total of 4096 samples is chosen only for convenience and memory 122 can be adapted to contain any number, such as P, samples with the sample occurring P times earlier in the sequence removed when a new sample is supplied through buffer 131. The total of accumulator 142 is divided by P in divider 143 to give a measure of the global mean.

The mean estimating circuit output signal at terminal 150 is connected to summing circuit 12 (FIG. 1) to translate the radar amplitude distribution to a substantially zero mean, as required. As explained, this mean is estimated from 4096 samples chosen at random from a scan sector which could be as large as 360° if desired. The same mean estimate may be subtracted from many radar video signal samples before the mean changes. The mean time constant established by control 22 will, in general, be fairly large, and is typically equivalent to the scan time for the sector enclosing the block of samples. Therefore, the estimate will not change rapidly even though the radar video signal level may change radically. This preserves any large local variations in signal such as may occur in mapping applications. It does, however, zero the mean on a large scale to ensure compatibility with the mean of the model distribution stored in the dynamic range compression circuits.

STATISTICAL ANALYZER

Statistical analyzer 16 measures the distribution of the radar video signal samples and responsive to this distribution circuit 17 controls amplifier 13 to match the variance of this distribution to the variance of a model video signal distribution contemplated by the range compression table stored in range compression circuit 15. The measure chosen to define the variance or width of the distribution is the fraction of total sample values falling above a given threshold, hereinafter called the tail breakpoint. Gain control amplifier 13 matches the variance of the radar video amplitude samples appearing at the output of signal processor 28 to the variance of a model video signal amplitude distribution.

Figure 5:
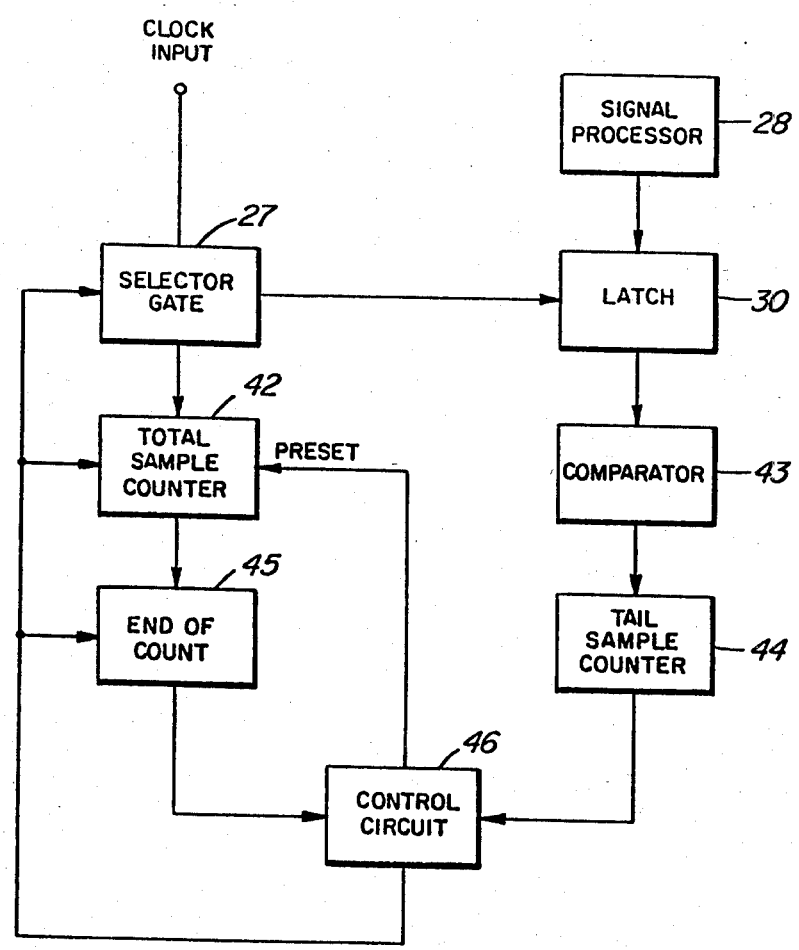

Referring to FIG. 5, samples of the radar video signal from signal processor 28, are selected by latch 30 under control of selector gate 27. Gate 27 is controlled by the clock input and the total number of samples counted in counter 42. The samples are supplied to a comparator 43 and the number of samples exceeding the tail breakpoint amplitude value are counted in counter 44. When counter 42 indicates a predetermined sample size has been achieved an end of count flip-flop 45 is triggered actuating control circuit 46 to stop the operation. The number of samples in counter 44 at that time is a measure of whether the gain of amplifier 13 should be increased or decreased. Such increase or decrease is regulated by the control circuit 17. A digital error signal that is a measure of the difference between the number of accumulated tail samples in counter 44 and an expected number determines the size of the step change in gain of amplifier 13.

DYNAMIC RANGE COMPRESSION CIRCUIT

This circuit 15 operates to provide optimum matching of the radar video signal amplitude distribution from signal processor 28 to the available CRT shades, by typically reducing a 12 bit signal to a 4 bit signal. One manner of achieving this is to provide a plurality of sets of tables which may be selected. For example, the shape of the model video amplitude distribution defined in compression table generator 29 may be chosen to match the expected amplitude distribution histogram of the received radar video signal. If the histogram of the selected table differs from the received radar video signal distribution only in its mean value and variance, a useful CRT display signal is produced at the output of circuit 15.

Figure 6:
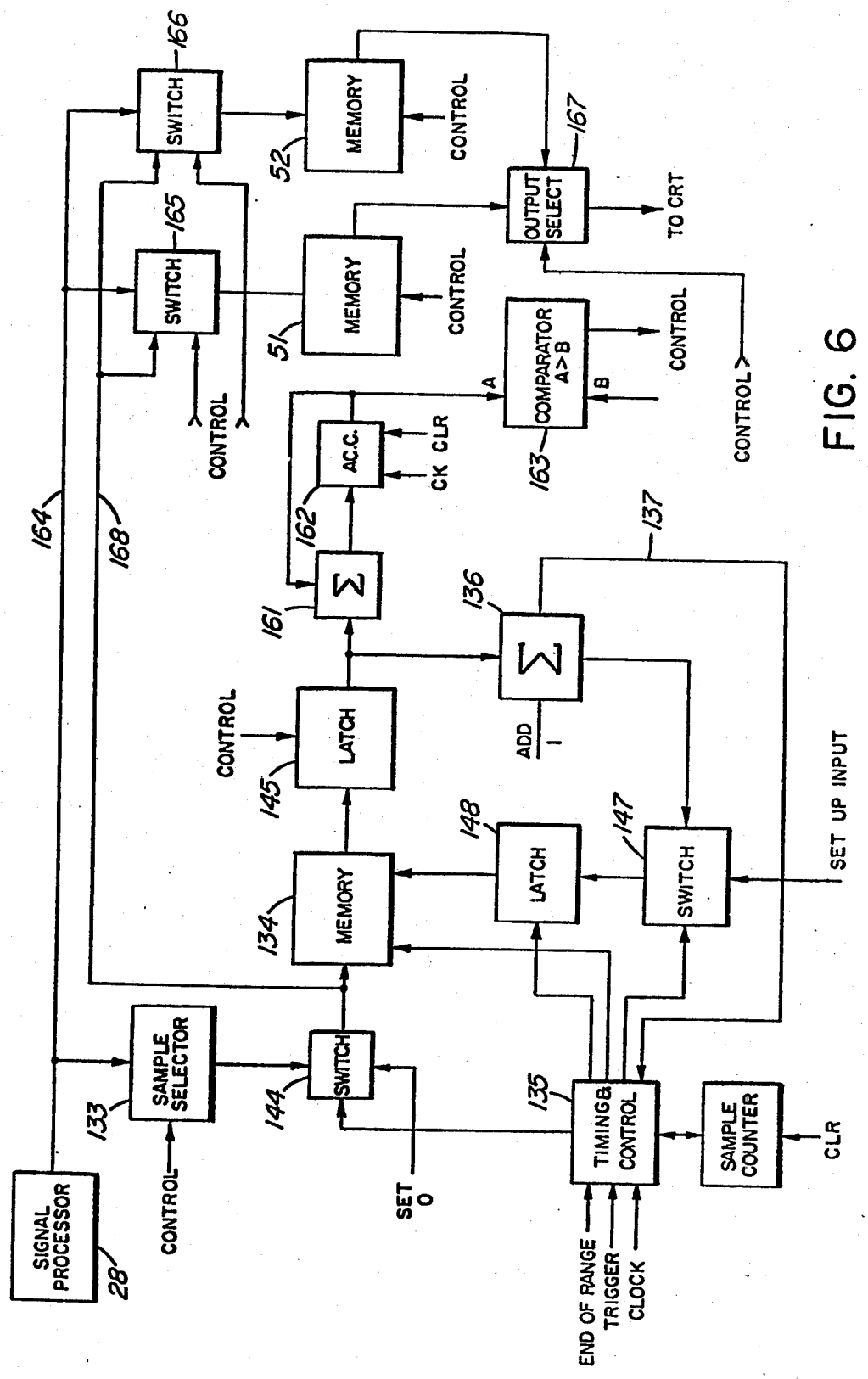
Figure 7:
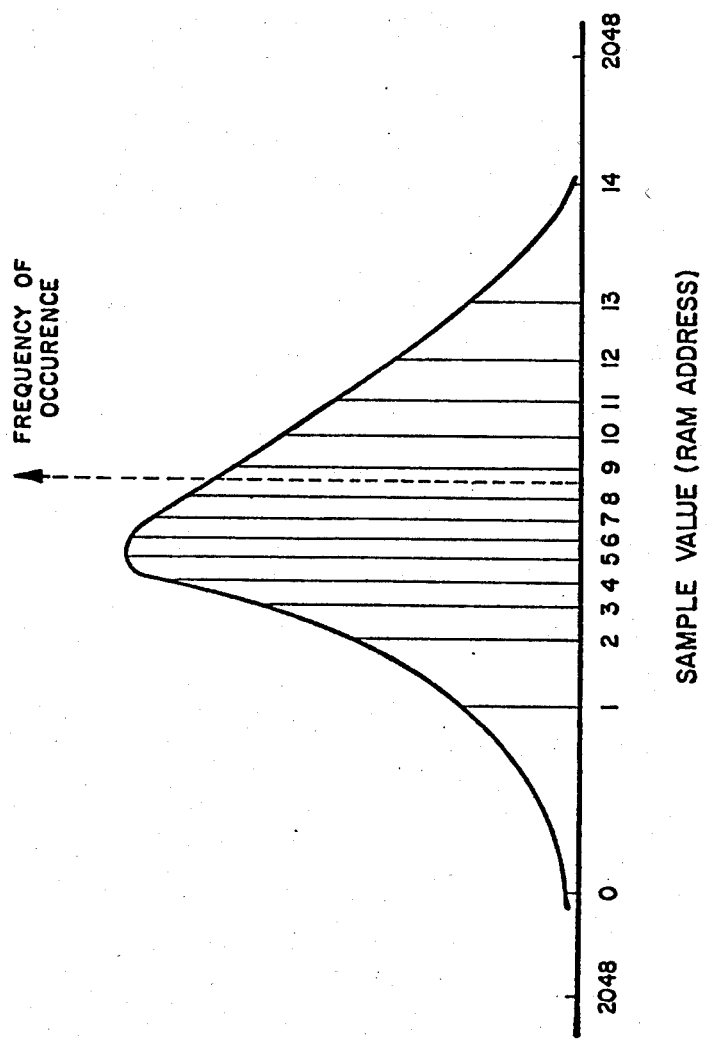
Figure 8:
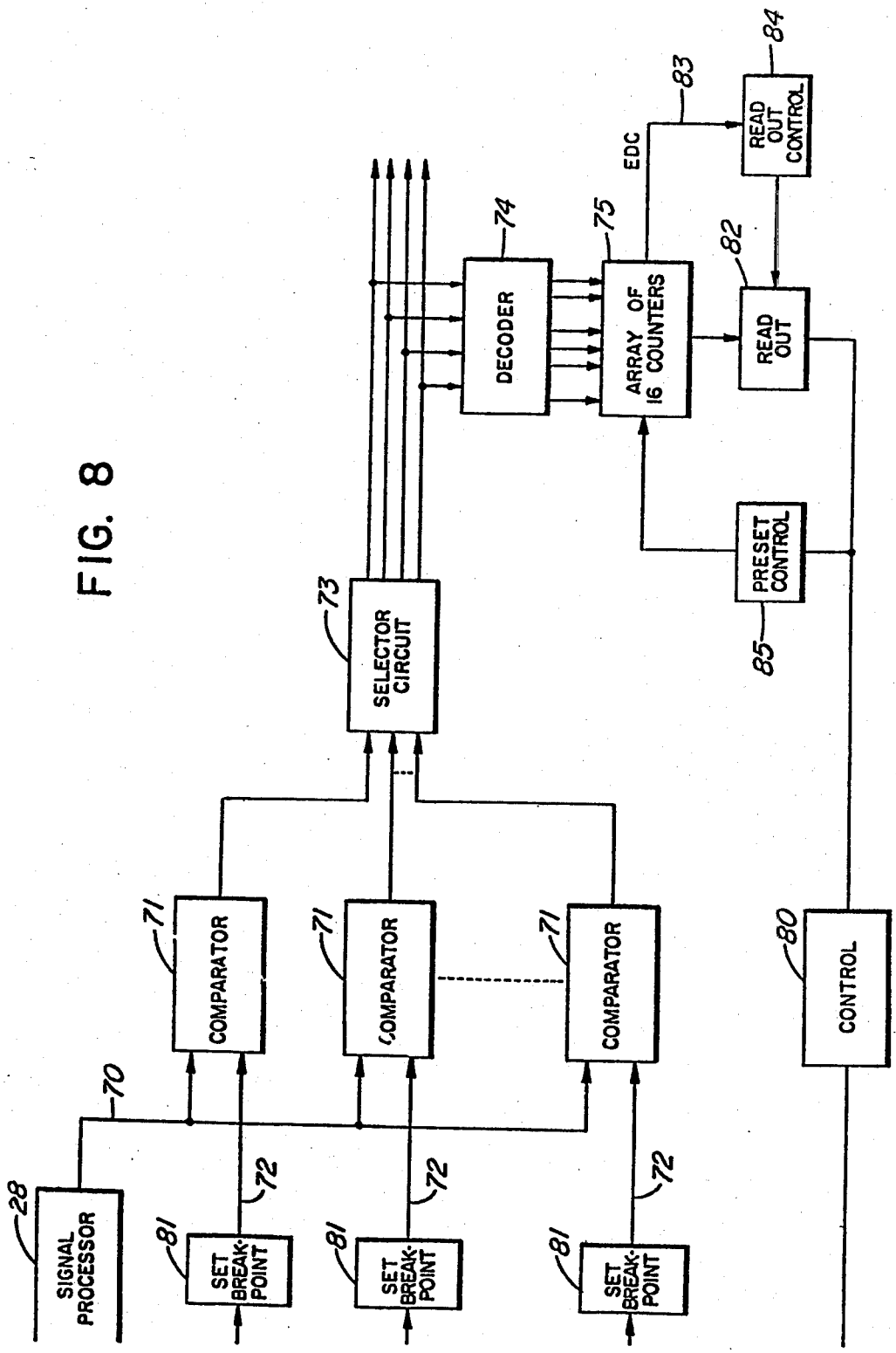

FIG. 7 is a typical histogram which is useful in considering the operation of adaptive systems to be described in regard to FIGS. 6 and 8. The distribution has a zero mean and the video amplitude signal samples are measured in 12 bit numbers having values extend from −2048 to +2048. The compression process, in the present example, produces a 4 bit output signal representing sixteen display brightness levels separated by breakpoints which may be positioned as shown in FIG. 7. The compression table then translates all radar video signal amplitude values from −2048 up to that corresponding to break-point 0 into output code 0000. Similarly, all radar video signal values between break-point 0 and break-point 1 are translated into output codes 0001 and so on up to break-point 15.

An adaptive method and apparatus for compressing the amplitude distribution of the radar video signal avoids the assumption of a stationary video amplitude distribution as previously discussed. Such stationary video amplitude distributions in any given operating mode are suitable for a number of real environments which are well matched to the stored compression tables but may be less useful under other conditions. The apparatus shown in FIG. 6 measures the histogram or amplitude distribution of the received radar video signal samples, computes break-points and provides a corresponding frequently changing compression table in random access memories 51 or 52 (FIG. 6).

The apparatus of FIG. 6 functions by first generating signals which are measures of the complete histogram of the amplitude distribution of the radar video signals, storing such histogram in a memory 141, determining the break-point distribution, computing which of the addresses in memory 141 correspond to the histogram break-points and, finally, writing each of the sixteen useable CRT codes into a separate compression table memory in blocks of addresses occurring between the various break-point addresses.

Specifically, referring to FIG. 6 the received radar video signal samples from signal processor 28, are delivered through a sample selector 133 and a control switch 144 to a histogram memory 134. The sampled radar video signals select particular addresses in the memory 134 according to their individual amplitudes and each time an address is selected the data stored at that address is read from memory, incremented by one and written back into memory at the same address by the loop formed by latch 145, accumulator 146, switch 147 and latch 148, all under the control of circuit 135.

Once memory 134 contains a complete histogram of the amplitude distribution of the received radar video signals, the break-point values are determined. FIG. 7 is an example of a distribution with the break-points having substantially equal areas therebetween and distributed across the full amplitude range. An equal probability distribution may lead to advantages in the display. To produce an equal probability distribution, the total number of samples included in the histogram is divided by the number of levels in a compressed video amplitude distribution (in this example 16) to determine the number of samples in each level of the compressed video distribution.

When summing circuit 136 indicates a count in excess of a preset maximum a signal on lead 137 to timing and control circuit 135 stops the initial portion of the cycle because the peak value of the histogram has then been reached. The data in memory 134 is then read out sequentially starting from the address corresponding to sample −2048. The numbers are read out via latch 145 and supplied to summing circuit 161 and its associated accumulator 162. Accumulator 162 keeps a running total of the numbers stored at the addresses read up to that point. When this running total reaches the same number as the number of samples for each level of the compressed distribution, comparator 163 is actuated thereby indicating that the address in memory 141 at which this occurs is the first break-point in the compressed distribution. Similarly, when the running total equals or exceeds the number of samples in the first two blocks then the address at which this occurs defines the second breakpoint and so on. This information is then used to set up the appropriate compression table in memories 51 or 52 by means of the relevant address being transferred to memory 51 or 52 via lead 168 and switches 165 and 166. Two compression tables are provided so that while one is being set up the incoming radar video signal can be compressed in the other. The compression table is in itself straightforward, the values 1, 2, 3, ... 15, being written sequentially at all addresses between pairs of break-points. Typically, the value 0 is written into the compression table at address 0 and possibly several adjacent higher addresses. The value 1 then occurs at all addresses from the last address containing 0 up to the address of the first break-point thus establishing the first quantization level. The value 2 is then written at all addresses between the first break-point up to the address of the second break-point thus establishing the second quantization level. The same procedure is followed for the remaining break-points. Once a compressed distribution table has been entered in memory 51 or 52 then it is used during a radar scan with the signal samples supplied on conductor 164 via switch 165 or 166 to the appropriate memory. The memory output, the compressed signal, is supplied to the display device via selection circuit 167. When one compression table is being used the other is being updated by the circuitry described.

The basic equal probability distribution may be modified to a different distribution by weighting to emphasize or deemphasize a particular range of amplitudes. If the total number of samples in the histogram is N, then the number of samples per level in the equal probability case is N/15. Apply weighting factors $W_i$, $i = 1, \ldots 15$, to each level to give $W_i N/15$ samples per level. The weighting is carried out in a predetermined manner with a necessary constraint on the weights being:

$$W_1 \frac{N}{15} + W_2 \frac{N}{15} + \cdots + W_{15} \frac{N}{15} = N$$

$$\frac{N}{15} (W_1 + W_2 + \cdots W_{15}) = N$$

or $$\sum_{i=1}^{15} W_i = 15$$

Thus, when a radar signal sample appears on line 164 and is transmitted through switch 165 or 166 to the appropriate compression table memory a compressed signal in the range 0 to 15 appears via switch 167 to be supplied to the CRT.

An alternative system for obtaining a uniform distribution histogram is shown in FIG. 8. In this system the break-points are varied in accordance with samples taken from the compressed amplitude distribution. The samples radar signal from processor 28 is supplied on line 70 to sixteen comparators 71, typically 8 bit capacity. Each comparator has a different predetermined break-point value set via input lines 72. Selector circuit 73 determines the highest level comparator which changes and thus the smallest break-point which just exceeds the amplitude of the sampled radar display signal. The output from selector circuit 73, representing this highest comparator, is then a 4 bit number which is the compressed data to be passed on to the display.

Control of the break-points is obtained by feeding the compressed data through a decoder 74 to a plurality of counters 75 one for each level of the compressed distribution. Thus, the number of occurrences of radar video signals at each of the 16 CRT amplitude levels on the output of selector 73 is counted separately. When any one of the counters reaches an end of count (EOC) a signal on lead 83 to read out control circuit 84 results in a read out of all 16 counters through circuit 82. The total is then counted and divided by 16 to obtain the number of counts expected in each level for an equal probability distribution. The break-points are then adjusted by control circuit 80 varying the values set in break-point encoders 81 to maintain the compressed amplitude distribution flat. The actual count in any counter is subtracted from the expected count to obtain the error. This variation in break-point value is in a direction as to reduce this error. If desired starting count numbers can be preset into counters 75 by control circuit 85.

As has been described in connection with FIG. 6 it is possible to utilize weighting factors to obtain a controlled deviation from equal probability distribution. The 16 values read from the 16 counters are multiplied by the weights prior to computation of the 16 error values. In this way, each error value contains a bias reflecting the corresponding weight. It is therefore the weighted distribution of samples which is controlled to be flat rather than the direct distribution itself. The actual distribution of video samples after compression deviates from an equal probability distribution according to the table of weights.

Thus there has been described a system for processing radar signals which modifies the signals to a form suitable for use in adaptive dynamic range compression circuits. While specific embodiments have been described it will be clear that variations in the described apparatus will be clear to one skilled in the art without departing from the scope of the invention.

The embodiments of the invention in which an exclusive property or privilege is claimed are described as follows:

1. A signal processing system to adapt a received signal for use with a display having a limited range of brightness comprising:
    means estimating a mean value of said signal over a significant portion of the area of the display and subtracting the estimated mean from the signal to form a modified signal having amplitude values distributed about a zero mean,
    means supplying the modified signal to a variable gain amplifier having its output connected to an analog to digital converter to provide a sequence of signal samples,
    a statistical analyzer responsive to said sequence of signal samples to determine the spread of the amplitude distribution of said signal samples.
    means controlling the gain of said amplifier to maintain the spread matched to that of a model distribution, and
    digital signal compression means responsive to the output of said analog to digital converter to produce an output digital signal of limited range for use with said display.

2. A system as set out in claim 1 wherein said estimating means operates on samples of the signal selected by a pseudo-random sequence.

3. A system as set out in claim 1 wherein said estimating means operates on samples of the signal selected by a random sequence.

4. A method of estimating the mean of a sequence of digital signals representing a radar return signal comprising the steps of:
    generating a pseudo-random sequences of pulses synchronized to the digital signal sequence to obtain a sequence of sampling signals from one characteristic of the pseudo-random sequence,
    selecting and storing such digital signals as occur in coincidence with the sampling signals;
    accumulating the values of said selected and stored digital signals up to a predetermined number thereof, therafter increasing the accumulated amount by the value of each next selected digital signal and decreasing the accumulated amount by the value of the digital signal occurring earlier by said predetermined number in the sequence selected, and
    using the accumulated amount as a measure of said mean.

5. A method of estimating the mean of a sequence of digital signals representing a radar signal comprising the steps of:
    generating a random sequence of pulses synchronized to the digital signal sequence to obtain a sequence of sampling signals from one characteristic of the random sequence,
    selecting the storing such digital signals as occur in coincidence with the sampling signals,
    accumulating the values of said selected and stored digital signals up to a predetermined number thereof, thereafter increasing the accumulated amount by each next selected digital signal and decreasing the accumulated amount by the value of the digital signal occurring earlier by said predetermined number in the sequence selected, and
    using the accumulated amount as a measure of said mean.

6. Apparatus for estimating the mean of a sequence of digital signals representing a radar signal comprising:
    a random clock generator responsive to said digital signal sequence to produce sampling signals in synchronism with some of said digital signals,
    a memory with a corresponding address counter,
    said address counter being responsive to said trigger signals to increment the address by one and store the corresponding digital signal at that address,
    an accumulator receiving the sequence of stored digital signals,
    means reading out previously stored signals at an address just prior to the new signal being stored at that address, and
    means subtracting each read out previously stored signal from the total in the accumulator, whereby the total in the accumulator is a measure of the mean.

7. Apparatus for estimating the mean of a sequence of digital signals representing a radar return signal comprising:
    a pseudo-random clock generator responsive to said digital signal sequence to produce sampling signals in synchronism with some of said digital signals,
    a memory with a corresponding address counter,
    said address counter being responsive to said trigger signals to increment the address by one and store the corresponding digital signal at that address,
    an accumulator receiving the sequence of stored digital signals,
    means reading out previously stored signals at an address just prior to the new signal being stored at that address, and
    means subtracting each read out previously stored signal from the total in the accumulator, whereby the total in the accumulator is a measure of the mean.

8. A circuit for maintaining the spread of the amplitude distribution of a signal matched to the spread of a model distribution, comprising:
    a variable gain amplifier having a gain control input receiving said signal,
    sampling means responsive to the output of said amplifier to provide a series of discrete sample values, amplitude discriminating means responsive to said series of discrete sample values to transmit those exceeding a preset value, a first counter coupled to said amplitude discriminating means to accumulate the number of sample values exceeding said preset value, a second counter coupled to said sampling means to accumulate the total number of sample values, means responsive to the accumulation of a predetermined count in said second counter to stop sampling and to supply a signal based on the count in said first counter to the gain control input of said amplifier.

9. A circuit as set out in claim 8 wherein the gain of the amplifier is reduced if the identified count in said first counter exceeds a predetermined number and vice versa.

10. A circuit as set out in claim 8 wherein the count in said first counter represents the upper tail breakpoint of the distribution.

11. Apparatus for transforming input signal samples of a certain amplitude distribution to a compressed amplitude distribution, including a system for establishing the break-points of the compressed distribution, comprising:

storage means having addresses corresponding to each possible input sample amplitude, means incrementing by one the number stored at an address on detection of an input sample of corresponding amplitude, a first counter counting the total number of signal samples and dividing the total by a factor representing the number of possible amplitudes in the compressed distribution to obtain the number of samples occurring at each amplitude level of the compressed distribution, a second counter responsive to said storage means to accumulate the stored numbers when read out in sequence including means to indicate when the accumulated count exceeds said last-mentioned number thereby establishing the address last read as the first break-point and further indicating when the accumulated count exceeds twice the last-mentioned number thereby establishing the second break-point and so on.

12. Apparatus as in claim 11, further including a compression table memory, means for entering a first level signal in the first address location, a second level signal in addresses between the second address location and the first break-point, a third level signal in addresses between the first and second break-points and so on.

13. Apparatus as in claim 11 further including weighting means modifying the number of samples in each amplitude level of the compressed distribution so as to be unequal.

14. A method of compressing the amplitude distribution of a series of signal samples falling within a finite amplitude range, comprising:

supplying the series of samples in parallel to a plurality of comparators having monotonically increasing level settings, detecting the comparator having a level setting immediately above the amplitude of the applied signal sample and generating an output signal indicative of that comparator, counting the number output signals supplied by each comparator in a complete series of signal samples, and adjusting the level settings of the comparators so that the counts attributable to each comparator remain substantially equal.

15. Apparatus for transforming input signal samples of a certain amplitude distribution to a compressed amplitude distribution comprising:

a plurality of comparators having monotonically increasing trip-level settings, means supplying said input signal in parallel to said comparators, a selector circuit connected to said comparators and responsive to the highest tripped comparator to generate an output signal indicative of that comparator, means counting the number of output signals relating to each comparator in a complete series of signal samples, and control means responsive to the relative numbers to adjust the trip-level settings so that each comparator has a substantially equal count.

16. A signal processing system to adapt a received signal for use with a display having a limited range of brightness comprising:

means estimating a mean value of said signal over a significant portion of the area of the display, a variable gain amplifier in the path of said signal followed by an analog to digital converter to supply a sequence of signal samples, a statistical analyzer responsive to said signal samples to determine the spread of the amplitude distribution of said signal samples, by determining the number of samples having an amplitude exceeding an upper tail break-point value, means controlling the gain of said amplifier to maintain the spread matched to that of a model distribution, and signal compression means responsive to the output of said amplifier to produce an output signal of limited range for use with said display.

17. A signal processing system to adapt a received signal for use with a display having a limited range of brightness comprising:

means estimating a mean value of said signal over a significant portion of the area of the display, a variable gain amplifier in the path of said signal followed by an analog to digital converter to supply a sequence of signal samples, a statistical analyzer responsive to said signal samples to determine the spread of the amplitude distribution of said signal samples, means controlling the gain of said amplifier to maintain the spread matched to that of a model distribution, and signal compression means utilizing data stored in a random access memory and responsive to the output of said amplifier to produce an output signal of limited range for use with said display.

18. A system as set out in claim 17 wherein the stored data is derived from a stored distribution of the signal samples.

* * * * *